United States Patent Office 3,413,862
Patented Dec. 3, 1968

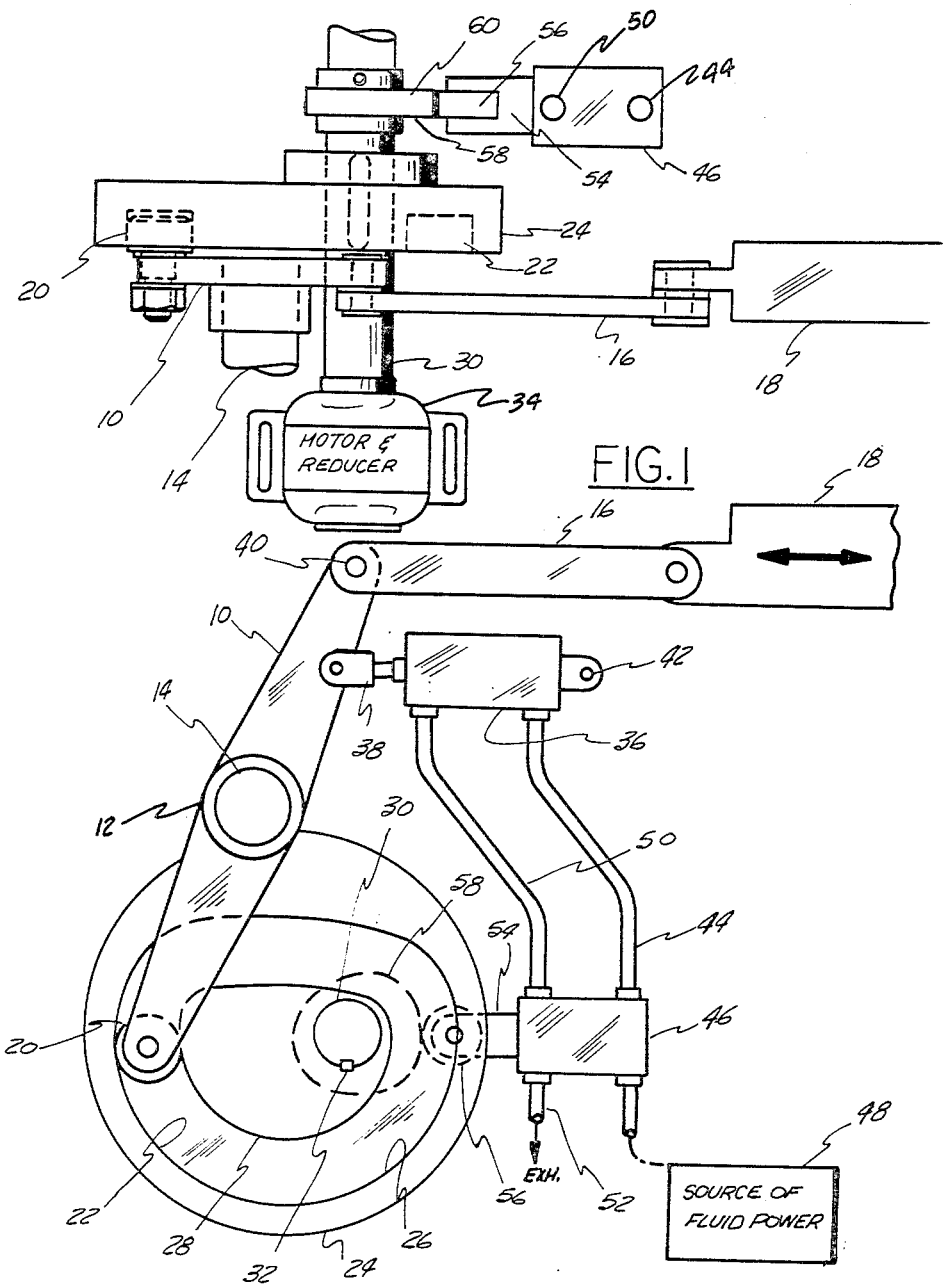

3,413,862
CAM CONTROLLED ACTUATOR INCLUDING INTERMITTENT TORQUE MEANS
William A. Waara, Detroit, Mich., assignor to Visi-Trol Engineering Corporation, Detroit, Mich., a corporation of Michigan
Filed Apr. 18, 1967, Ser. No. 635,300
10 Claims. (Cl. 74—53)

ABSTRACT OF THE DISCLOSURE

An actuating arm supported for rocking movement about its midpoint has one end attached to an article to be reciprocated in forward and return strokes. The opposite end of the arm has a roller engaged in a closed groove of a rotating cam. The configuration of the groove defines variations in acceleration and deceleration in the movement of the article in its forward and return paths. A motor or other rotating means provides a continuous torque sufficient to rotate the cam during low torque portions of the forward and return strokes. A cam actuated fluid cylinder is connected to the arm and provides an added intermittent torque to assist the rotating means during high torque portions of the forward and return strokes.

Background of the invention

*Field of the invention.*—This invention relates to actuating mechanisms and more specifically to a rocker arm for producing an alternating motion requiring a variable torque input during forward and return power strokes and including a source of continuous low torque input assisted by a secondary source of torque during high power portions of the forward and return strokes.

*Description of the prior art.*—This invention is related to that class of mechanical actuators intended to achieve a controlled oscillating motion of an article between forward and return strokes.

This type of mechanism is often employed in machines such as high speed assembly machines where it is often desirable that the driven article be moved between precisely controlled limits at variable rates of acceleration and deceleration. Inherently, in any mechanism intended to produce variable motion, the force required to actuate the drive member varies as a function of the acceleration and deceleration characteristics of the driven member.

One approach of the prior art to achieve the aforementioned oscillatory motion takes the form of a hydraulic cylinder having an extensible rod arranged to extend and retract in a controlled manner. This approach has serious drawbacks in that it does not provide a positive or precise way of positioning the driven article. In order to achieve any degree of variation in the movement of the rod in a power stroke, a sophisticated arrangement of electrical controls are usually required between the source of power and the cylinder. An other drawback is associated with the limitation in the speed of the actuating rod.

A second approach to achieve the aforementioned motion is similar to the hydraulic approach, however, this method employs a pneumatic source of power. This method, while widely utilized, has essentially the same drawbacks as the hydraulic approach. In addition, there is an erratic movement of the rod member resulting from the inherent compressibility of the fluid medium.

Another approach to this problem, mechanical in nature, employs a rocker arm or lever member pivoted about an intermediate point to transmit motion from a driven cam operatively connected to one end of the lever to the driven article suitably attached to the other end of the lever. The cam often takes the form of a cam member supported for rotation and defining a closed groove operatively engaged through a roller member to the end of the lever. As the cam rotates, the roller member produces a driving force on the lever sufficient to reciprocate the article. The contour of the groove defines the acceleration and deceleration of the article and the diameter of the groove defines the limits of the forward and return strokes.

The drawback with the aforementioned mechanical approach is that in order to produce a motion with any sizable variations in the acceleration and deceleration of the driven article, the cam member assumes a rather substantial size to absorb the transmittal forces. Furthermore the driving force rotating the cam requires a motor having a rather substantial size. This is because the motor must be adapted to accommodate the maximum torque associated with the lever.

It is the broad purpose of the present invention to provide an improved cam actuated lever requiring a driving motor of only nominal size and a cam member having a size dictated primarily by the motion of the driven member with a secondary source of torque acting directly on the lever during those portions of travel of the driven member requiring a high torque input.

Summary

The preferred embodiment of the present invention, which will be subsequently described in greater detail, contemplates a cam actuated lever supported for rocking motion with a driving end attached to an article to be oscillated and a driving end provided with a roller engaged in a rotating grooved cam. Preferably the grooved cam is carried by a shaft driven by a suitable power means such as a motor. The motor rotates the cam at a uniform rate, the variable movement of the driven article being defined by the shape of the cam groove. The force required to move the lever varies as a function of the acceleration characteristics of the driven member. Thus, a portion of the forward and return power strokes of the driven member requires a low torque input, while the remainder of the power strokes requires a high torque input.

The low torque portion of the power strokes are provided by the motor, through the cam to the lever. To assist the motor to drive the lever during the high torque portions of the forward and return strokes, a fluid cylinder is connected directly to the lever with a rod arranged to extend or retract in a power stroke. The fluid torque assisting device is actuated to produce its intermittent power stroke by a second cam carried by the shaft supporting the grooved cam. The second cam has a contour arranged to control a 4-way control valve connected between a source of fluid power and the fluid cylinder.

It is therefore an object of the present invention to provide an improved cam operated actuating mechanism for producing an oscillating motion by producing a pivotally supported lever, a rotating cam associated with a driving end of the lever to define the variable movement for the lever, and a source of power connected to the lever and arranged to act on the lever during portions of the oscillating motion characterized by a rapid increase in acceleration.

It is another object of the present invention to reduce the size of cam actuated lever mechanisms by providing such a mechanism wherein a cam defines the rate of oscillatory motion of the driven end of the lever member, the cam having a size to accommodate a relatively small torque, and wherein a second torque producing means is connected directly to the lever to produce a force on the lever during those portions of the forward and return strokes of the driven end of the lever requiring a high torque input.

Still further objects and advantages of the present invention will readily occur to one skilled in the art to which the invention pertains upon reference to the following detailed description.

Description of the drawings

The description refers to the accompanying drawings in which:

FIG. 1 is a plan view of a cam actuated mechanism illustrating a preferred embodiment of the invention with parts cut away for purposes of clarity; and FIG. 2 is an elevational view of the cam actuating mechanism illustrated in FIG. 1.

Description of the preferred embodiment

Now referring to the drawings, a lever member 10 is supported for pivotal movement about its midpoint 12 by a pivot 14. The upper end of the lever 10 is pivotally connected through a link 16 to a driven member 18. The member 18 is arranged to be reciprocated between a leftward movement and then a rightward movement in what will be referred to as a forward stroke and a return stroke.

The lower end of the lever 10 has a roller member or follower 20 engaged in a groove 22 formed in a face of a cam member 24. The groove 22 is defined by a pair of spaced apart cam surfaces 26 and 28. The cam surfaces 26 and 28 cooperate with the roller member 20 to define the movement of the lever 10.

The cam member 24 is supported for rotation to a shaft 30 and is preferably fixed to the shaft 30 by a key 32. A motor 34 having a suitably reduced output provides means for rotating the shaft 30. Preferably the motor 34 is arranged to rotate the shaft at a uniform rotation. Thus, it can be seen that as the shaft 30 rotates, the cam surfaces 26 and 28 engage the roller 20 to reciprocally pivot the lever 10 so that the member 18 is moved through its forward and return stroke at a selected and variable rate of speed.

The cam surfaces 26 and 28 normally alternately engage the roller 20. Thus assuming the cam 24 is rotated in a counterclockwise direction as viewed in FIG. 2, the cam surface 26 engages the roller 20 to move the member 18 toward the left, and then at the end of its leftward stroke, the opposite cam surface 28 engages the roller 22 to return the member 18 toward the right. The cam surfaces 26 and 28 are contoured to very precisely define the limits of the forward and return stroke of the member 18 and the acceleration pattern between the limits.

It is obvious that the torque necessary to move the lever between positions corresponding to the forward and return strokes of the member 18 requires a variable torque input. The torque input is generally a minimum as the roller 20 alternates engagement with the cam surfaces 26 and 28 and is a maximum at a point defined by the shape of the cam surfaces 26 and 28. Thus, normally there is a portion in both the forward and return strokes requiring a relatively high torque input and other portions of the strokes requiring a lesser torque input. Power assist means are provided to cooperate with the motor 34 in moving the lever 10 during those portions of the forward and return strokes requiring a high torque input. This power assist means takes the form of a power cylinder 36 having an extensible rod member 38 pivotally connected to the lever 10 at 39. The opposite end of the cylinder 36 is connected to a suitable pivot 42.

The cylinder is connected by a flexible line 44 and valve means 46 to a source of fluid power 48. The valve means 46 preferably comprises a conventional four-way control valve adapted to supply pressure through line 44 to extend the rod 38 in a power stroke or alternately through a second line 50 associated with the opposite end of the cylinder 36 to retract the rod 38. The spent fluid is exhausted through a line 52. Thus, it can be seen that the valve means 46 is intended to connect the source of fluid power 48 to the cylinder 36 to either extend or retract the rod 38 in a power stroke depending on the condition of the valve.

The valve is preferably of the type having an actuating member 54 carrying a roller member or follower 56. The actuating member 54 is arranged to extend into or retract from the valve 46, its position determining the condition of the valve that is whether the valve 46 is in a neutral position, or is actuating the cylinder 56 in a power stroke.

A second cam member 58 is carried by the shaft 30 and has a surface 60 in continual engagement with the roller member 56. The surface of the cam 58 cooperates to move the actuating member 54 into either an extended or retracted position thereby controlling the condition of the valve 46. The cam surface 60 is contoured so that during those portions of the forward and return strokes of member 18 requiring high torque, the actuating member 54 is moved to a position to produce a power stroke of the rod 38 so that a secondary force acts on the lever 10 in combination with the motor 34. During periods of low torque, the valve means 46 is arranged so that the cylinder 56 is in a neutral position, so that the rod 38 is carried by the lever 10 rather than acting on the lever 10.

Thus, it is to be understood that the contour 60 of the cam 58 corresponds to the torque input required for the lever 10. The rotation of the cam 58 controls the cylinder 36 so that the secondary force is applied to the lever 10 only when a high torque situation arises in the forward and return strokes.

The term "fluid" in this description includes but is not limited to that class of air and hydraulic media which may be pressurized to transmit energy.

Although I have described but one preferred embodiment of my invention, it is to be understood that various changes and revisions can be made therein without departing from the spirit of the invention as expressed in the scope of the appended claims.

I claim:

1. An actuating mechanism for moving an article backwardly and forwardly, comprising:
   (a) an arm member, said arm member supported for reciprocal pivotal motion;
   (b) said arm member having a first portion, said first portion adapted for connection to an article to be moved;
   (c) said arm member having a second portion, said second portion radially spaced from the axis of pivotal support of said arm member;
   (d) a first cam member, said first cam member being supported for rotation;
   (e) a first follower member, said first follower member providing a connection between said second portion of said arm member and said first cam member to provide positive driving of said first follower member with a characteristic motion so that said first portion moves alternately between a forward path and then in a return path;
   (f) means for rotating said first cam member, said rotating means having a torque sufficient to rotate said cam member through portions of said forward and return paths and insufficient to rotate said cam member through complementary portions of said forward and return paths;
   (g) torque producing means, said torque producing means connected to said arm member and operable to produce a force on said arm member; and
   (h) actuating means, said actuating means effective to energize said torque producing means when said first portion of said arm member is travelling through said complementary portions of said forward and return paths.

2. An actuating mechanism as defined in claim 1, wherein said torque producing means comprises a fluid cylinder, a rod supported for reciprocal extensible movement from said cylinder, said rod operatively connected to said arm member, a source of fluid power, valve means operable to introduce said fluid power to said cylinder and effective to produce a power stroke of said rod in a selected direction, said valve means responsive to a signal from said actuating means.

3. An actuating mechanism as defined in claim 2, including a second cam member, said second cam member supported for rotation in combination with said first cam member; a second follower member, said second follower member providing a connection between said second cam member and said rod member to permit positive driving of said second follower member with a characteristic motion so that said valve means opens a connection between said source of fluid power and said cylinder so that said rod cooperates with said rotating means to produce a combined torque having a magnitude sufficient to move said first portion of said arm member through said complementary portions of said forward and return paths.

4. An actuating mechanism as defined in claim 2, including a shaft, and said first and second cam members being supported by said shaft for rotation about a common axis.

5. An actuating mechanism as defined in claim 3, wherein said first cam member includes a pair of spaced cam surfaces defining a closed groove; said groove arranged around the axis of rotation of said shaft, and said first follower member being engaged with said cam surfaces in alternating relationship to drive and said first portion between forward and return strokes.

6. An actuating mechanism as defined in claim 4, wherein said rotating means rotates said shaft at a uniform rate.

7. An actuating mechanism as defined in claim 5, wherein said first and second portions are associated with opposite extreme ends of said arm member.

8. An actuating member as defined in claim 6, wherein one of said cam surfaces defining said groove is associated with said arm in a forward stroke and the opposite of said cam surfaces is associated with said arm in said return stroke.

9. An actuating mechanism as defined in claim 7, wherein said first and second cam members are locked to said shaft.

10. An actuating mechanism as defined in claim 7, wherein said first follower is engaged in rolling contact with said cam surfaces.

References Cited

UNITED STATES PATENTS

| | | | |
|---|---|---|---|
| 2,070,633 | 2/1937 | Topham | 74—53 |
| 2,408,679 | 10/1946 | Palmer | 74—53 XR |
| 2,677,281 | 5/1954 | Gibson | 74—53 |
| 2,692,509 | 10/1954 | Gibson | 74—53 |
| 3,045,856 | 7/1962 | Cornell | 74—53 XR |

ROBERT A. O'LEARY, *Primary Examiner.*

M. A. ANTONAKAS, *Assistant Examiner.*